United States Patent [19]

Ohashi et al.

[11] Patent Number: 5,073,832
[45] Date of Patent: Dec. 17, 1991

[54] CARRIAGE CONTROLLING APPARATUS FOR FLOPPY DISK APPARATUS

[75] Inventors: Kunio Ohashi, Shizuoka; Kunihiko Matsumoto, Fuji, both of Japan

[73] Assignee: Kabushiki Kaisha Toshiba, Kawasaki, Japan

[21] Appl. No.: 370,709

[22] Filed: Jun. 23, 1989

[30] Foreign Application Priority Data

Jun. 24, 1988 [JP] Japan .............................. 63-156535

[51] Int. Cl.$^5$ ............................................... G11B 5/56
[52] U.S. Cl. .................................. 360/75; 360/77.02; 360/78.04
[58] Field of Search ............... 360/78.08, 78.04, 77.02, 360/75

[56] References Cited

U.S. PATENT DOCUMENTS

| | | | |
|---|---|---|---|
| 4,428,012 | 1/1984 | Applequist et al. | 360/106 |
| 4,644,418 | 2/1987 | Banno et al. | 360/48 X |
| 4,771,346 | 9/1988 | Shoji et al. | 360/78.04 X |
| 4,924,333 | 5/1990 | Hamaoka | 360/75 |

FOREIGN PATENT DOCUMENTS

64-7422  7/1989  Japan .

Primary Examiner—Aristotelis Psitos
Assistant Examiner—David L. Robertson
Attorney, Agent, or Firm—Oblon, Spivak, McClelland, Maier & Neustadt

[57] ABSTRACT

In a discrimination mode for discriminating a track density mode of an FDD using a carriage mechanism of the lead screw type, on the basis of a reciprocal seek operation of a magnetic head, when a carriage is moved a seek distance dependent on a track density in a forward seek mode, the drive of the carriage mechanism can reliably be stopped. This realizes a reciprocal seek operation of the head that depends on a track density mode of the FDD. Accordingly, a host computer compares the number of pulses contained in a STEP signal in a forward seek stroke with that in a reverse seek stroke, and reliably discriminate a track density mode of the FDD on the basis of the comparison result.

14 Claims, 9 Drawing Sheets

CARRIAGE CONTROLLING APPARATUS FOR FLOPPY DISK APPARATUS

BACKGROUND OF THE INVENTION

1. Field of the Invention

The present invention relates to a carriage controlling apparatus for a storage device such as, for example, for use in a floppy disk drive system. The invention includes both apparatus and method of the discriminating.

2. Description of the Related Art

In a general floppy disk drive system, a floppy disk drive (FDD) is provided with a mechanism for moving a carriage with a magnetic head in a radial direction of a recording medium, such as a floppy disk. As such a mechanism, a lead screw mechanism is known, which uses a lead screw rotatively driven by a stepping motor. The lead screw has a spiral groove. A needle coupled with the carriage engages the groove. When the lead screw is rotated by the motor, the needle converts a rotating motion into a rectilinear motion, and transfers it to the carriage. The carriage is generally provided with a pair of heads, an S0 head for the side 0 of the recording medium and an S1 head for the side 1. When the lead screw is rotatively driven, the carriage with the paired heads rectilinearly moves in the radial direction for seeking a destination track on the recording medium. The paired heads, when positioned at the destination track, applies a read/write operation to that track.

The FDD of the 5.25-inch type, for example, comes in two varieties, the 48TPI mode FDD for a recording medium whose track density is 48TPI (track per inch) and the 96TPI mode FDD for a recording density of 96TPI. The 96TPI mode FDD is able to read data out of the recording medium of 48TPI, but the 48TPI mode FDD is unable to write data on and read data from the recording medium of formatted in the 96TPI mode. Therefore, the host computer in the floppy disk drive system must discriminate the format mode of an FDD used, i.e., between the 48TPI mode or the 96TPI mode. A known system to discriminate the mode of the FDD exists. In this system, an FDD is connected to a floppy disk drive system. A floppy disk as a recording medium is set to the FDD. The carriage is moved from the outer side of the floppy disk to the inner side, and vice versa, i.e., a reciprocal seek operation is performed. According to the number of tracks (seek distance) over which the carriage has been reciprocated, the host computer determines the TPI mode of the FDD used in the floppy disk drive system.

To be more specific, the paired heads (referred frequently to as a head) are moved from the outermost track on the floppy disk (track 0) as a reference track to the innermost track (45 track of the floppy disk of 48TPI, for example). This stroke of the head or carriage is called a forward seek operation. Then, the head is moved reversely, viz., from the innermost track to the outermost track. This stroke is called a reverse seek operation.

The host computer compares the number of step pulses (FS) obtained through the forward seek operation with that (RS) obtained through the reverse seek operation. The step pulses are contained in a STEP signal for driving a stepping motor as a drive source for the carriage. The STEP signal is produced by a floppy disk controller (FDC), and is then applied to a control circuit (containing a microprocessor as a major component) for the FDD. Ordinarily, the head is moved one track every step pulse. A seek distance caused by one step pulse in the 48TPI mode FDD is the double of that in the 96TPI mode FDD. Accordingly, a seek distance corresponding to 45 tracks in the 48TPI mode FDD is equal to that corresponding to 90 tracks in the 96TPI mode FDD.

When the number of step pulses FS is equal to that RS, FS=RS, the host computer decides that the FDD used is a 96TPI mode FDD. When FS>RS, it decides that the FDD is of the 48TPI mode. When a STEP signal consisting of 45 pulses, for example, is produced, in the case of the 48TPI mode FDD, the carriage hits against a carriage stopper at the position corresponding to 42 tracks, to a standstill, in the forward seek mode. In the reverse seek mode, the carriage moves from the position of 42 tracks where it was stopped in the forward seek mode, to the track 0 of the reference track. A track-zero sensor installed in the FDD detects that the carriage reaches the track 0, and generates a signal. The FDC receives this signal from the FDD and stops the outputting of the STEP signal. It is understood that in the reverse seek mode, 42 pulses of the STEP signal are produced. The number of step pulses (45 pulses) in the forward seek mode is larger than that (42 pulses) in the reverse seek mode.

In the FDD discriminating system as mentioned above, in the case of the 48TPI mode FDD, when the carriage collides against the carriage stopper in the forward seek mode, there is the possibility that the needle of the lead screw mechanism will slip off the groove. If the needle slips off, it runs on the surface of the lead screw to a standstill. Under this condition, if the forward seek mode is switched to the reverse seek mode, the lead screw reversely rotates and the needle slips in the grooves again. A STEP signal in the reverse seek mode is outputted from the FDC during the transient period that the needle on the lead screw slips into the groove. Accordingly, 45 pulses sometimes have been produced till the carriage moves and reaches the track 0. If so, FS is equal to RS although the FDD now used is of the 48TPI mode. On this fact, the host computer mistakenly recognizes that the FDD used is a 96TPI mode FDD.

Thus, in the FDD mode discriminating system which discriminates the FDD mode on the basis of the data obtained by the reciprocal seek operation, the needle of the lead screw mechanism slips off the groove of the lead screw. The seek distance of the head sometimes fails to amount to the number of step pulses. The host computer mistakenly recognizes the TPI mode of the FDD used, leading to incorrect TPI mode discrimination.

SUMMARY OF THE INVENTION

An object of the present invention is to provide a carriage controlling apparatus for a floppy disk apparatus, in which a lead screw mechanism is used as a carriage driving means. In the present invention, the rotation of the lead screw is stopped when the magnetic head has performed its seeking operation to a predetermined track position on the innermost side of the recording medium so as to prevent a motion transmitting member, serving to convert the rotation of the lead screw into a linear motion and to transmit the linear motion to the carriage, from being disengaged from a groove formed on the surface of the lead screw.

According to the present invention, there is provided a carriage controlling apparatus for a floppy disk apparatus, comprising: carriage means having a magnetic head mounted thereon and driven by a stepping motor so as to allow the magnetic head to seek in the radial direction of a recording medium; carriage driving means including a lead screw which is rotated by the stepping motor and a motion transmitting member which is engaged with a groove formed on the surface of the lead screw so as to convert the rotation of the lead screw into a linear motion which is transmitted to the carriage means so as to move the carriage means in the radial direction of the recording medium; and drive control means serving to stop the carriage drive means when the magnetic head has performed its seeking to a predetermined track position on the innermost side of the recording medium.

With such an arrangement, in discriminating a track density (TPI) mode of the disk drive (FDD) on the basis of the reciprocal seek operation by the magnetic head carried on the carriage, when the magnetic head moves a seek distance determined on the basis of the track density mode, the carriage can reliably be stopped. Therefore, a TPI mode of the FDD can exactly be discriminated through the reciprocal seek operation of the head in accordance with the TPI mode.

DETAILED DESCRIPTION OF THE PREFERRED EMBODIMENTS

Figure 1:
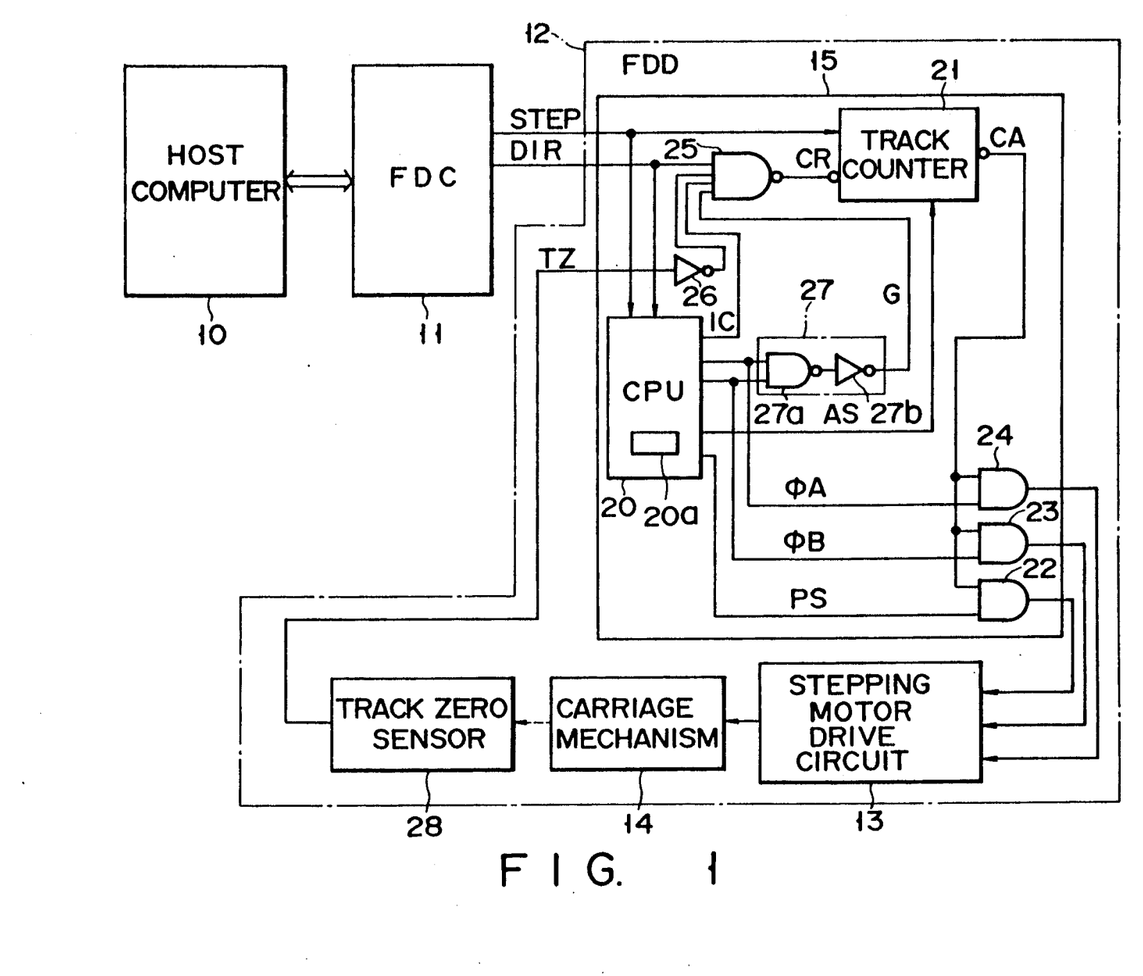
FIG. 1 is a block diagram showing a configuration of a disk drive according to a first embodiment of the present invention.

Reference is made to FIG. 1 showing a floppy disk system according to a first embodiment of the present invention will be described with reference to FIG. 1. As shown, the floppy disk system is made up of a host computer 10, FDC 11 and FDD 12. The host computer 10 executes the overall control of the floppy disk system, and particularly discriminates track density modes of the FDD 12. The FDC 11 serves as an interface between the host computer 10 and the FDD 12, and transfers and receives various interface signals necessary for driving the FDD 12. The FDC 11 may be constructed with an LSI, for example, Model uPD765 by NEC Co., in Japan. The FDD 12 is provided with a mechanism to execute the read/write operation in connection with a recording medium, such as a floppy disk. The FDD 12 includes a stepping motor drive circuit 13, carriage mechanism 14, and a carriage drive control circuit 15.

Figure 3:
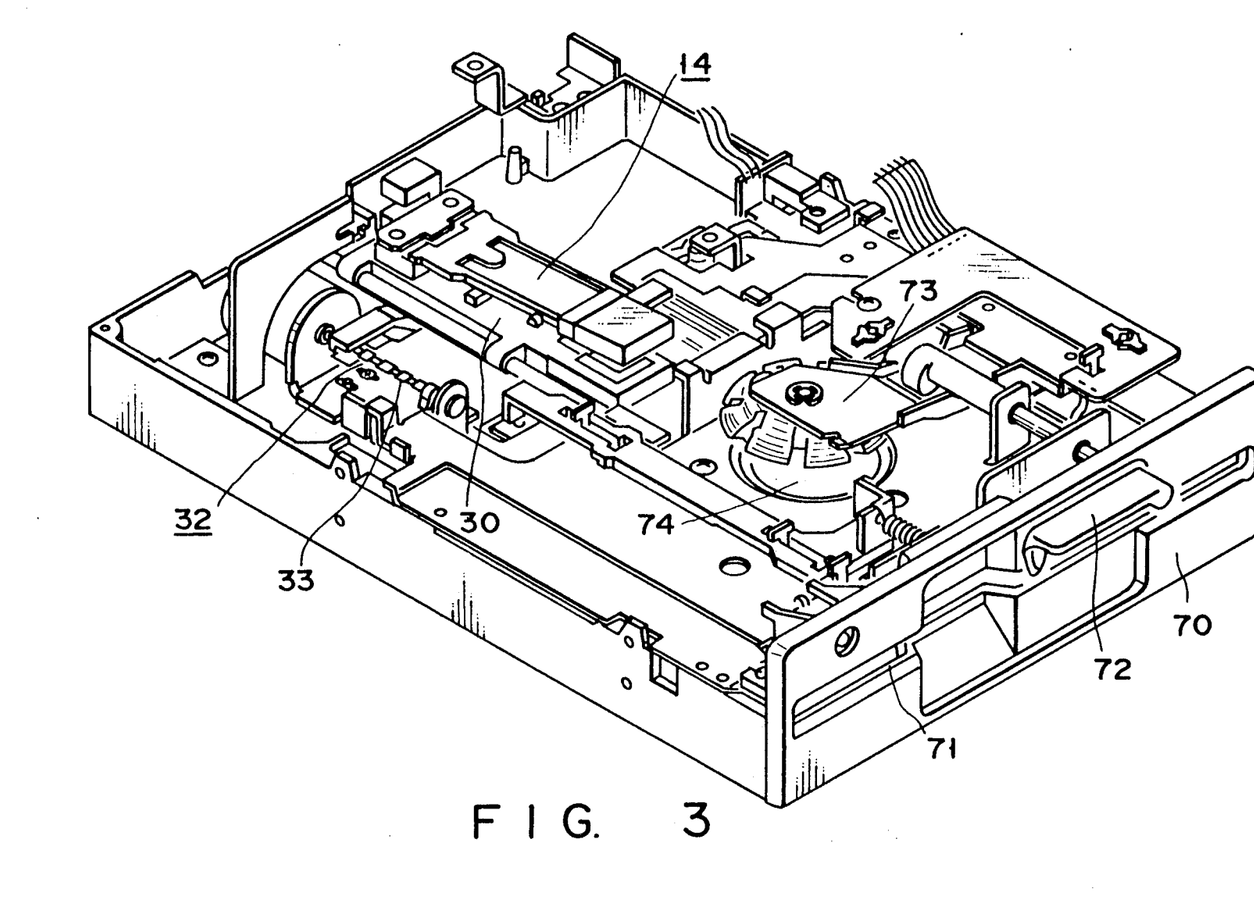
FIG. 3 is a perspective view showing a mechanism of the disk drive of FIG. 1.

The FDD 12, as shown in FIG. 3, is provided with the carriage mechanism 14 with a carriage 30 having a head at the distal end portion, and a lead screw mechanism 32 constituting a drive mechanism for the carriage 30. The carriage mechanism 14 engages a lead screw 33. In the carriage mechanism 14, a rotating motion of the lead screw 33 is converted into a rectilinear motion, and the rectilinear motion drives the carriage in the radial direction of a recording medium (not shown). The recording medium is fully inserted into the FDD 12 through a slot 71 of a front panel of the FDD 12, and a lever 72 is turned downwardly. Then, the recording medium is fixed to a spindle mechanism 74 by a clamp mechanism 73. The spindle mechanism 74 is for turning the recording medium.

Figure 9:
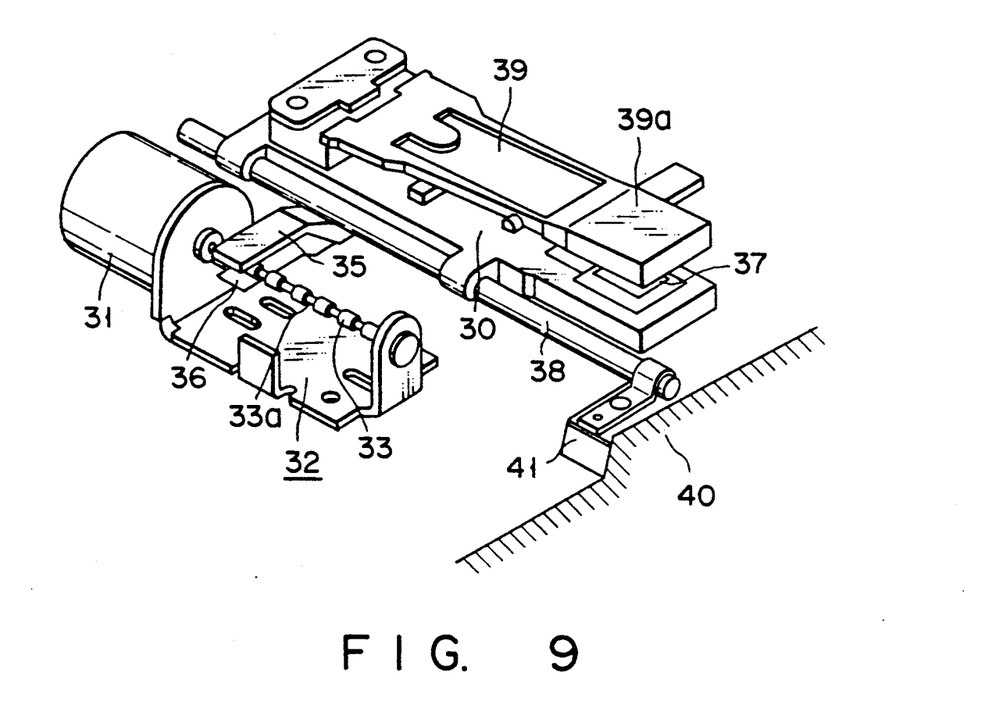
FIG. 9 is a perspective view showing a carriage mechanism according to the first embodiment of the present invention.
Figure 10:
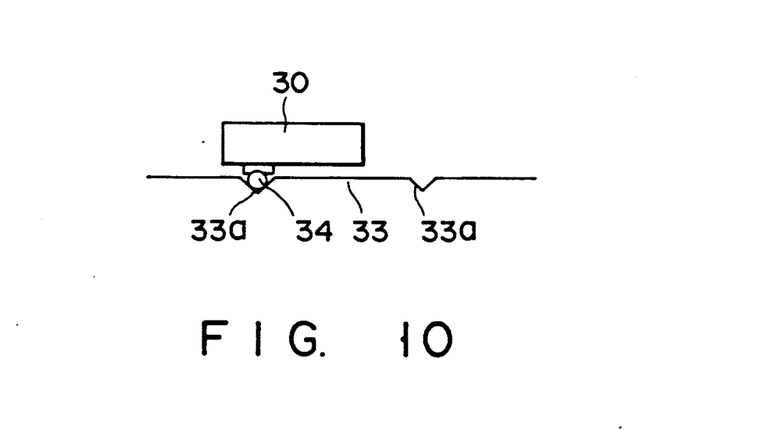
FIG. 10 shows a side view showing a part of the carriage mechanism according to the first embodiment.

As best illustrated in FIG. 9, the lead screw mechanism 32 is provided with the lead screw 33 that is rotated by a stepping motor 31. A spiral groove 33a is formed in the circumferential circuit of the lead screw 33. A needle (designated by 34 and best illustrated in FIG. 10) is slidably put in the groove 33a. When the lead screw 33 rotates while engaging the needle 34, the needle 34 moves rectilinearly. The rectilinear motion of the needle 34 drives the carriage 30. The needle 34, as shown in FIG. 9, is supported by a needle support member 35 fixed to the carriage 30, and constantly pressed against the lead screw 33 by means of a plate spring 36. An S0 head 37 is mounted at the distal end portion of the carriage 30. The carriage 30, together with the head 37, is guided along a guide rail 38, and is movable in the radial direction of the recording medium. The carriage 30 is further provided with a head arm 39. An S1 head (not shown) is mounted to a distal end portion 39a of the head arm 39, while confronting with the S0 head 37. A carriage stopper 41 of a frame 40 of the FDD 12 stops the movement of the carriage 30 when the carriage reaches the innermost of the recording medium.

Returning to FIG. 1, the carriage drive control circuit 15 is made up of a microprocessor (CPU) 20 serving as a control circuit (FDMC) for controlling the respective drive mechanisms, and a track counter 21 for detecting a track position of the heads that is moved for a seek operation in the radial direction of the recording medium by the carriage mechanism 14. The CPU 20 may be constructed with an LSI, for example, Model TMP47C-460 by TOSHIBA Co., in Japan. The track counter 21 may be up/down counter, for example, Model LS193 by TOSHIBA Co., in Japan.

The CPU 20 receives a step pulse (STEP) signal corresponding to a seek command applied to the paired heads from the FDC 11, and a direction (DIR) signal indicative of a seek direction, i.e., a forward seek direction or a reverse seek direction. In the reverse seek direction, the head pair moves from the inner side of the recording medium to the outer side. In the forward seek direction, the head pair moves from the outer side to the inner side. In response to the STEP signal and the DIR signal from the FDC11, the CPU 20 applies a start-up signal PS for starting up the stepping motor 31 and phase pulses $\phi A$ and $\phi B$ for controlling the rotation of the stepping motor 31 to the first input terminals of AND gates 22 to 24. The CPU 20 includes a counter register 20a for counting the pulses of the STEP signal and storing the count. An output signal (count-up signal) CA of the track counter 21 is applied to the second input terminals of the AND gates 22 to 24. These AND gates are enabled by the count-up signal CA, and produce output signals (corresponding to the phase pulses $\phi A$ and $\phi B$, and the start-up signal PS) for transmission to the stepping motor drive circuit 13. In accordance with the output signals from the AND gates 22 to 24, the stepping motor drive circuit 13 drives the stepping motor 31 in the carriage mechanism 14. The circuit 13 may be an LSI of Model TA7774F manufactured by TOSHIBA Co., in Japan.

In response to an addition/subtraction control signal AS derived from the CPU 20, the track counter 21 counts the pulses of the STEP signal derived from the FDC11. When a predetermined count (number of tracks) is reached, the track counter 21 produces a signal CA of logical "L". The counter 21 is reset by an output signal CR of a NAND gate 25. The NAND gate 25 is coupled for reception with a DIR signal from the FDC 11, an output signal of an inverter 26 receiving a track-zero signal TZ, an initializing complete signal IC from the CPU 20, and an output signal G of a gate circuit 27 receiving the phase pulses $\phi A$ and $\phi B$. The gate circuit 27 is a series circuit made up of a NAND gate 27 and an inverter 27b.

The FDD 12 further contains a track-zero sensor 28. In a seek mode of the head, the carriage 30 is moved to a position corresponding to track 0 (zero), that is, the outermost track on the recording medium, the track-zero sensor 28 detects that position. Upon the detection, the track-zero sensor 28 produces a track-zero signal TZ indicating that the paired heads have reached the track zero, and applies it to the inverter 26 in the carriage drive control circuit 15. The track-zero sensor 28 is photosensor, commercially available as Model S7641 manufactured by TOSHIBA Co.

The operation of the disk drive system thus arranged will be described.

In a normal seek mode, the carriage 30 of the carriage mechanism 14 is moved in the radial direction of the recording medium, to place the paired heads above a target track on the recording medium. At the initial stage immediately after the power on of the FDD 12, the paired heads start to move from the track 0 as the outermost track on the recording medium toward the inner side of the recording medium, and is positioned above a target track. Then, the head writes data into the target track or reads out data from the track.

In this seek mode, in response to an instruction from the host computer 10, the FDC 11 outputs a STEP signal corresponding to a seek command and a DIR signal indicative of a seek direction to the CPU 20 of the FDD 12. In response to those signals from the FDC 11, the CPU 20 produces a start-up signal PS for starting up the stepping motor 31 and the phase pulses $\phi A$ and $\phi B$ for the rotation control of the stepping motor. In the normal seek mode, an output signal of logical "H" CA has been applied to the second input terminals of the AND gates 22 to 24, from the track counter 21. Accordingly, the AND gates 22 to 24 are in an enabled state. Therefore, in this mode, the start-up signal PS and the phase signals $\phi A$ and $\phi B$ that are derived from the CPU 20, pass through the AND gates 22 to 24 and reach the stepping motor drive circuit 31. In response to the start-up signal PS, the drive circuit 13 starts up the stepping motor 31, and drives the stepping motor 31 in a direction and by the number of rotations as are defined by the phase pulses $\phi A$ and $\phi B$.

In the carriage mechanism 14, the stepping motor 31 turns the lead screw 33, the needle 34 slidably put in the groove 33a of the lead screw 33 converts the rotation of the lead screw 33 into a rectilinear motion which in turn is transferred to the carriage 30. With the rectilinear motion of the carriage 30, the paired heads, S0 head 37 and S1 head, move in the radial direction of the recording medium and reach a target track. At this time, the FDC 11 produces a STEP signal containing the number of pulses amounting to a distance (corresponding to the number of tracks) that the paired heads are to travel.

Figure 2A:
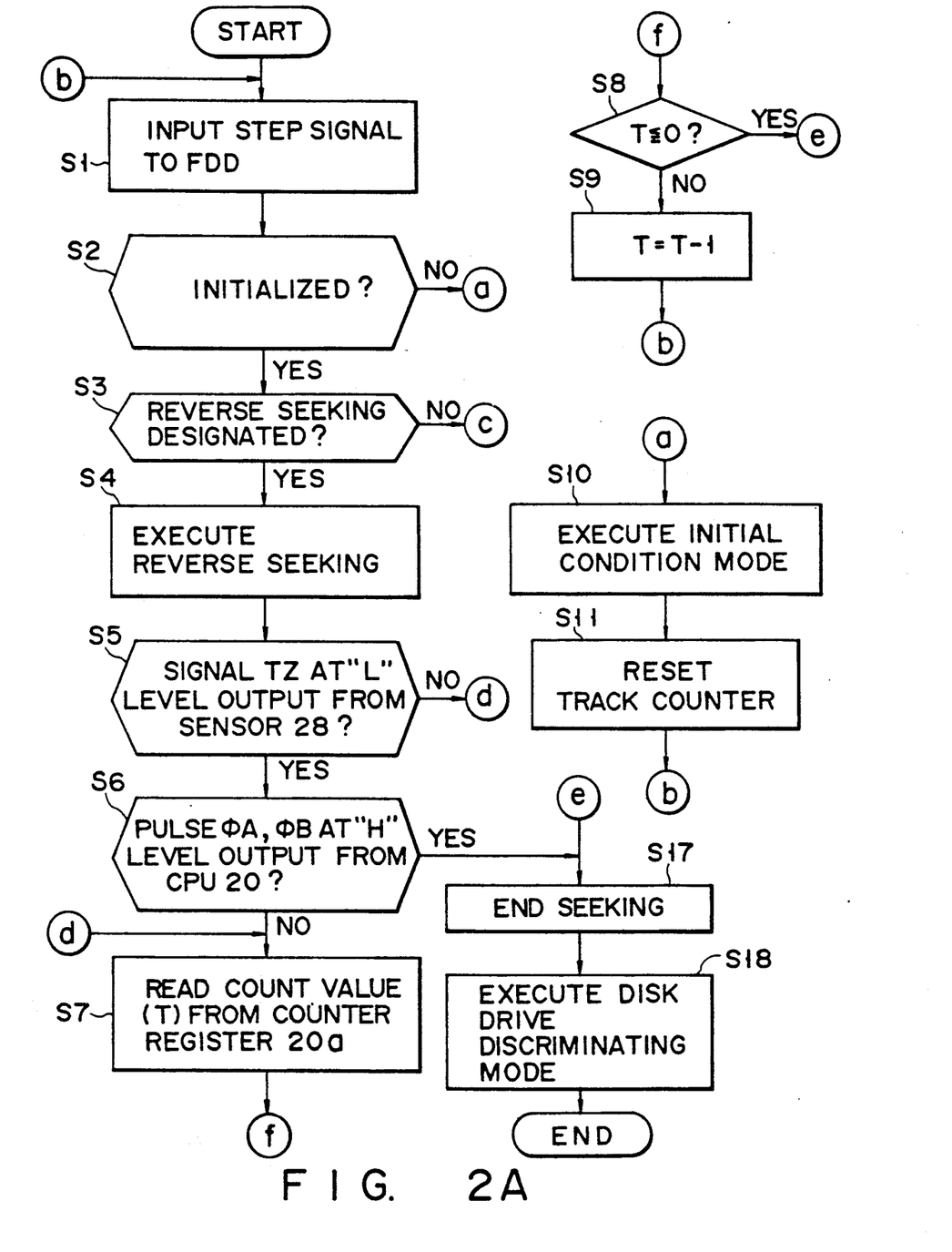
FIGS. 2A and 2B cooperate to show a flowchart useful in explaining the operation of the disk drive according to the first embodiment of the present invention.
Figure 2B:
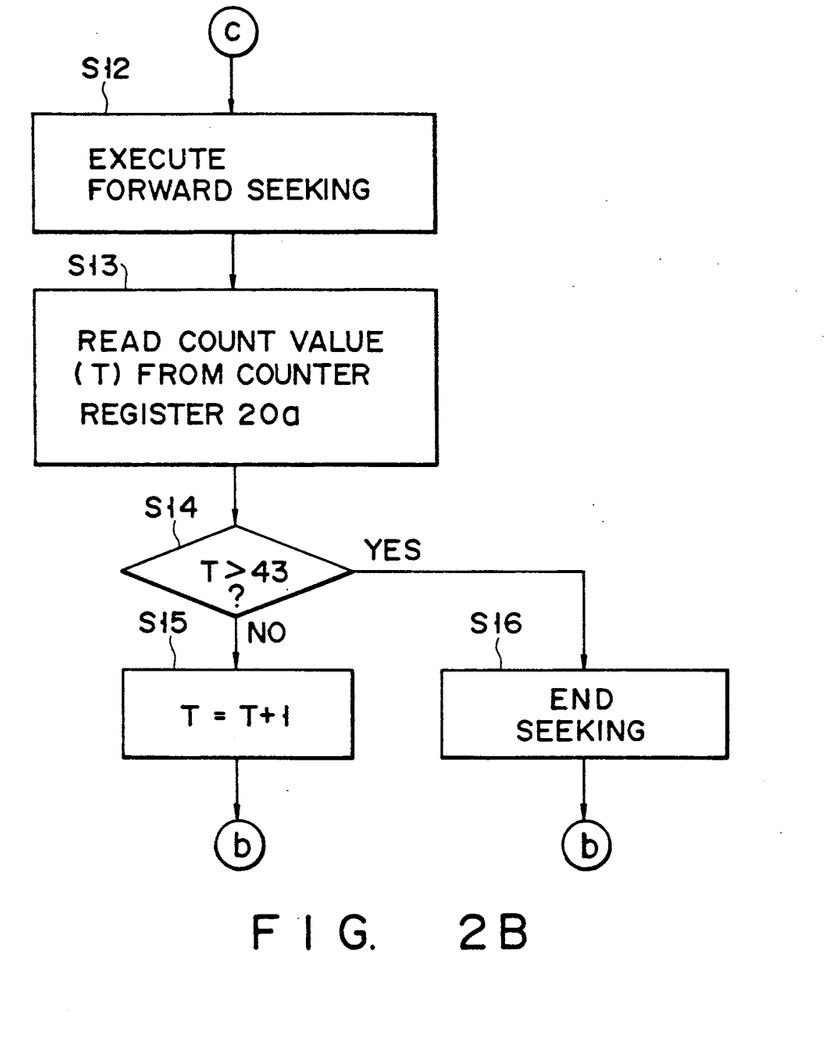

Before the seek mode, a discrimination mode is executed which is for discriminating a track density mode of the FDD 12 used by the disk drive system. In this instance, in the discrimination mode, control decides if the track density mode is a 48TPI mode or a 96TPI mode on the basis of a reciprocal seek (including a forward seek and a reverse seek). With particular reference to FIGS. 2A and 2B, when the host computer 10 instructs a start of the discrimination mode, i.e., start in FIG. 2A, the FDC 11 outputs a first STEP signal for input to the FDD 12, i.e., Step S1 in FIG. 2A. When receiving the first STEP signal from the FDC 11, the CPU 20 executes the processings of an initializing mode (Step S2 i.e., if initialization has not been completed at Step S2, then Steps S10 and S11 are executed and the program proceeds back to Step S1 as described in the following). The CPU 20 produces a start-up signal PS and phase signals $\phi A$ and $\phi B$, to start up the stepping motor 31 and to move the carriage 30 up to the track 0, that is, the outermost track which serves as a reference position.

When the carriage 30 reaches the position of the track 0, the track-zero sensor 28 detects its position and produces a track-zero signal TZ of logical "L". At this time, both the phase signals $\phi A$ and $\phi B$ are both in logical "H", so that the gate circuit 27 produces an output signal G of logical "H". The CPU 20 produces an initializing end signal IC of logical "H" indicative of the completion of the initializing mode. The FDC 11 outputs a DIR signal of logical "H" indicating the forward seek direction. These signals condition the NAND gate 25 to cause it to produce a signal CR of logical "L" for transmission to the reset terminal of the counter track 21. Then, the track 21 is reset in Step S11 and, when the next STEP signal arrives, it starts to count the STEP signal.

When the FDC 11 outputs the next STEP signal after the initializing mode terminates, in Step S11, the carriage 30 starts a seek operation (forward seek) by the discrimination mode. The CPU 20 recognizes from the DIR signal of logical "L" derived from the FDC 11 that the seek direction is the forward seek direction, i.e., in Step S3, of FIG. 2A, determination is made that reverse seeking is not designated and therefore, the program proceeds to step S12 of FIG. 2B and forward seeking is executed as follows. The CPU 20 produces a start-up signal PS and phase pulses φA and φB, to start up the stepping motor 31 and to move the carriage 30 p to the track 0, that is, the outermost track which serves as a reference position. The CPU 20 causes the head pair to execute the forward seek operation (Step S12). Here, the CPU 20 counts the number of pulses of the STEP signal outputted from the FDC11, and stores the count into the counter register 20a contained in the CPU 20. The count loaded into the counter register 20a is equal to that in the track counter 21, and corresponds to a preset seek distance (number of tracks) that the head pair is to travel. The CPU 20 reads out the count from the counter register 20a in Step S13 of FIG. 2B, and checks the count to determine if the head pair has reached the preset track position (e.g., 43 tracks) in Step S14.

The track counter 21 counts up the STEP signal every pulse in accordance with the addition/subtraction control signal AS applied from the CPU 20 in Step S15 if it is determined in Step S14 that T is less than 43 in that a count "43" is preset in the track counter 21. When receiving the number of pulses "43" of the STEP signal, the track counter counts up to produce a signal CA of logical "H".

Such an operation is repeated, so that the carriage 30 is moved in accordance with the STEP signal from the FDC 11 and the head pair moves in the forward seek direction, viz., from the outer side of the recording medium to its inner side.

Figures 11A, 11B, 11C, 11D, 11E, 11F, 11G, 11H, 11I:
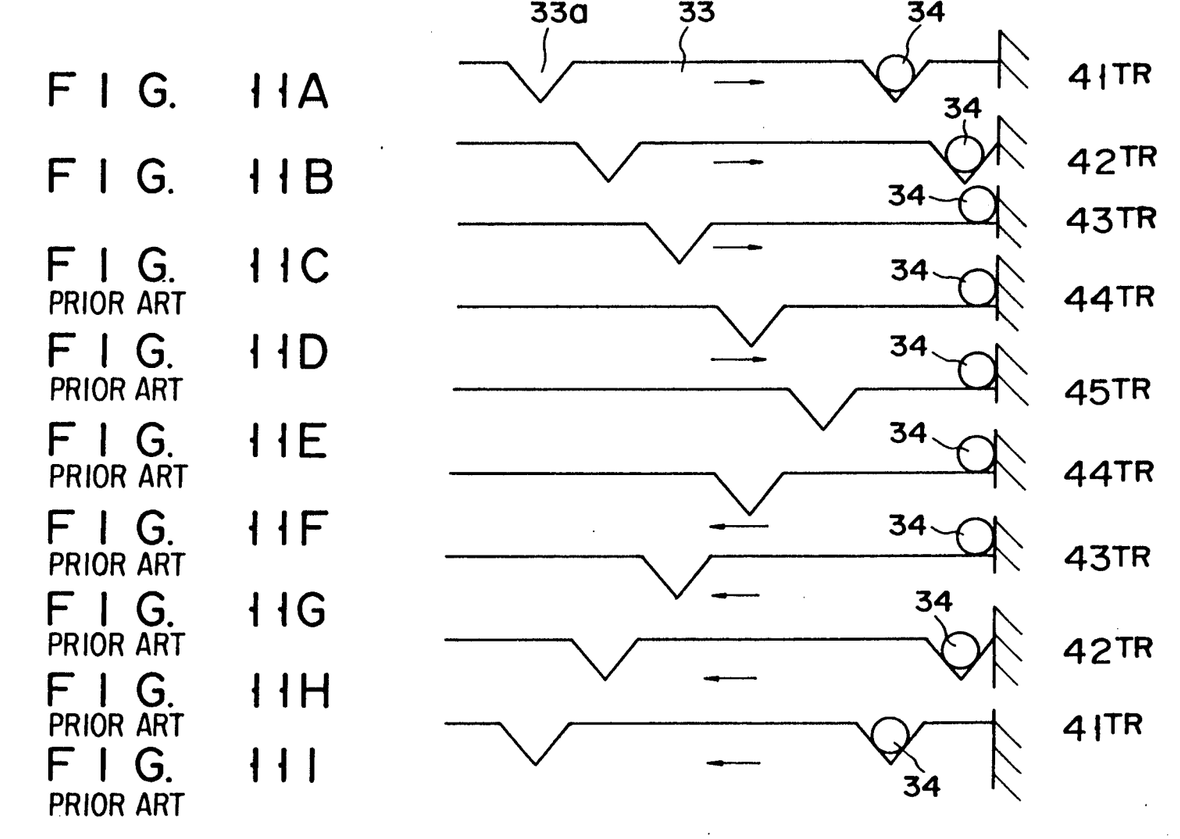
FIGS. 11A through 11I are a set of schematic illustrations for explaining the operation of a lead screw mechanism according to the first embodiment in connection with a needle, of the carriage.

Turning now to FIGS. 11A to 11I, there are provided diagramatical illustrations how the needle 34 in the lead screw mechanism 32 is displaced in connection with track positions (TR) when the head pair engages in the seek operation according to the present invention as compared to the prior art. As shown in FIG. 11B, when the head pair reaches the 42TR (42 tracks), in the case of the FDD 12 of the 48TPI mode, in a forward seek mode, the carriage 30 hits against the carriage stopper 41 that is located at the position corresponding to 42 tracks (FIG. 9), and stops there. In the discrimination mode in the instant embodiment, the host computer 10 produces a STEP signal containing the number of pulses amounting the seek distance to 45TR. Accordingly, at the position of the 42TR, as shown in FIG. 11B the carriage 30 physically becomes stopped. At this time, however, the stepping motor 31 runs in accordance with the STEP signal (seek distance 45TR) and the lead screw 23 is also rotating. Under this condition in the prior art arrangements, the needle 34 slips off the groove 33a and runs onto the surface of the lead screw 33 as shown in FIG. 11C. This arises from the fact that the plate spring 36 pressing the needle 34 against the lead screw 33 is smaller than the torque of the motor 31. Since the host computer 10 has set the seek distance to 45TR, the lead screw 33 is rotated in a forward direction as shown in FIG. 11D and stopped at track 45 as shown in FIG. 11E. Thereafter, the direction of rotation of lead screw 33 is reversed as shown in FIGS. 11F-11G and the needle 34 is returned to groove 33a as shown in FIGS. 11H-11I, but indexing is lost in the prior art arrangement.

To cope with this, in the present invention, when the track counter 21 counts "43" of the pulses of the STEP signal, it produces a signal CA of logical "L". In response to the signal CA, the AND gates 22 to 24 are disabled to block the flow of the signals PS, φA and φB from the CPU 20. As a result, the lead screw 33 goes to a standstill as shown in FIG. 11B. Accordingly, when the carriage 30 moves to a position of the 42TR and is stopped by the carriage stopper 41, the stepping motor 31 stops even if the STEP signal from the FDC 11 is present. The lead screw 33 is in a standstill and at this time the needle 34 is in the groove 33a as shown in FIG. 11B.

When the host computer 10 outputs the STEP signal of 45 pulses and terminates the forward seek mode in Step S16 of FIG. 2B, it starts a reverse seek mode by proceeding back to Step S1 of FIG. 2A. In this mode, the FDC 11 outputs a DIR signal of logical "H" and a STEP signal, and the carriage 30 moves toward the outer side of the recording medium by the number of tracks corresponding to the number of pulses of the STEP signal, as in the forward seek mode. That is, the CPU 20 causes the head to execute the reverse seek operation in Step S4 of FIG. 2A as follows. In the reverse seek mode, the CPU 20 counts down every pulse of the STEP signal. The track counter 21 likewise counts down every pulse of the STEP signal in accordance with the addition/subtraction signal AS from the CPU 20 as executed by Step S9 of FIG. 2A providing that a YES is determined in Step S5, a NO is determined in Step S6 and a NO is determined in Step S8. Thus, the CPU 20 and the track counter 21 counts down from the count "42" that is attained in the forward seek mode, and this is done every pulse of the STEP signal.

The CPU 20, as in the forward seek mode, reads the count out of the counter register 20a every time the FDC 11 outputs the STEP signal, providing the foregoing conditions in Steps S5, and S6 are satisfied and judges from the count if the head pair is seeking the track 0 as the reference track in Steps S7 and S8. At this time, the track counter 21 starts to count, and changes a logical state of the signal CA from logical "L" to logical "H". Accordingly, the AND gates 22 to 24 are enabled to allow the signals PS, φA and φB to pass therethrough to the stepping motor drive circuit 13 as described above.

The carriage 30 moves from the innermost (42TR) of the recording medium to the outermost, viz., in the reverse seek direction, and reaches the position of the track 0 as the outermost track on the recording medium. At this time, the track-zero sensor 28 produces a track-zero signal TZ of logic "L". When the CPU 20 recognizes that the track-zero signal TZ, and the phase pulses φA and φB are in logical "H", in Steps S5 and S6, respectively, it stops the outputting of the phase pulses φA and φB, and terminates the seek mode by proceeding to Step S17.

After completion of the reciprocal seek mode, i.e., the forward and reverse seek modes, the host computer 10 advances to a discrimination mode of the FDD 12 (Step S18). During the reverse seek stroke of the carriage 30, the host computer 10 temporarily stores the number of pulses RS of the STEP signal from the FDD 11. Here, the track counter 21 has stored a count "1" as the result of subtraction of "42" of the number of pulses RS from the "43" at the time of the seek operation. The host computer 10 compares the number of pulses RS in the reverse seek mode with that FS in the forward seek mode. If FS > RS, it decides that the FDD 12 has the 48TPI mode. As has been described, the number of pulses FS, which forms the STEP signal during the forward seek operation, is 45, whereas the number of pulses RS, which forms the STEP signal during the reverse seek operation, is 42. Therefore, the host computer 10 determines that the FDD 12 has the 48TPI mode. If the comparison result is FS=RS, the host computer decides that the FDD 12 has the 96TPI mode. In the case of the 96TPI mode, even when the FDC 11 produces a STEP signal containing 45 pulses in the forward seek mode, the carriage 30 moves track 0, and hence the number of pulses RS is 45. Consequently, in the case of the 96TPI mode, the FS is equal to the RS.

Thus, in the discrimination mode to discriminate a track density of the FDD 1 used in the disk drive system, that is being executed in accordance with the number of pulses contained in the STEP signal in the reciprocal mode of the carriage 30, when the head pair seeks the preset innermost track of the recording medium, the turning of the lead screw 33 of the carriage mechanism 14 is reliably stopped. Accordingly, in discriminating a track density of the recording medium, 48TPI or 96TPI, even if the "45" pulses are applied, in the case of the FDD 12 of the 48TPI, when the carriage 30 seeks the innermost track (42TR), the lead screw 33 of the carriage mechanism 14 stops its rotation. Therefore, the disk drive system under discussion is free from such a problematic situation that the needle 34 of the lead screw mechanism 32 slips off the groove 33a of the lead screw 33 and rides on the surface of the lead screw (see FIGS. 11C to 11E). The result is to be able to obtain the reliable reciprocal seek strokes of the carriage 30, and to reliably discriminate a track density of the FDD 12 on the basis of the reliable reciprocal seek stroke.

Figure 4:
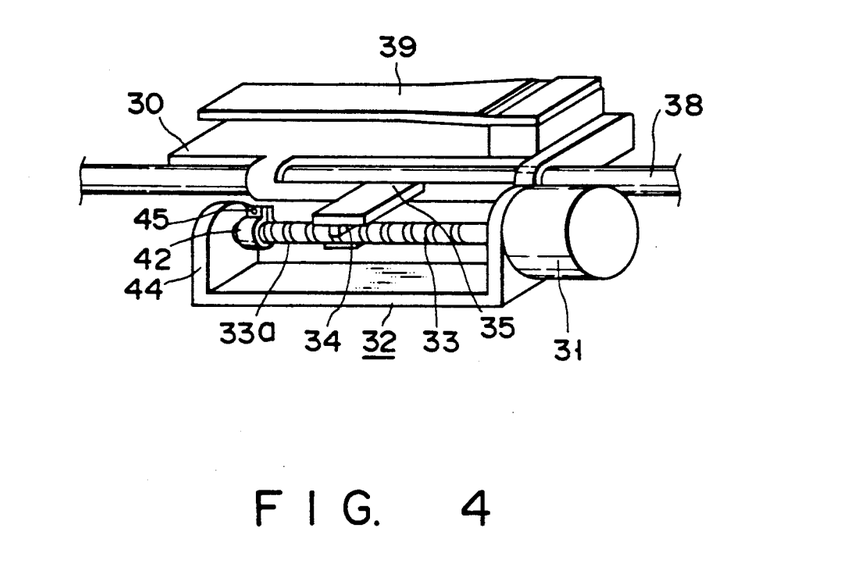
FIG. 4 is a perspective view showing a carriage mechanism according to a second embodiment of the present invention.

Turning now to FIG. 4, there is shown a carriage mechanism according to a second embodiment of the present invention as shown, the carriage mechanism is provided with a lead screw stopper 42 The lead screw 33 is rotated by the motor 31 and the needle 34 engaging the groove 33a of the lead screw 33 moves rectilinearly. The stopper 42 is provided for stopping the moving lead screw at a predetermined position. The stopper 42 is constructed with a ring like metal plate, and is removably fixed to the end portion of the lead screw 33 by means of a screw 45. In mounting the stopper 42, it may be positioned at any location as viewed in the axial direction of the lead screw 33 (seek direction).

Figure 5:
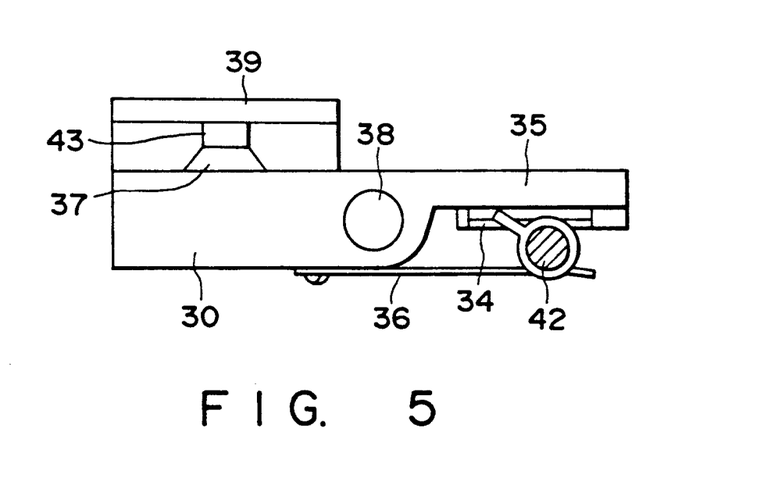
FIG. 5 is a side view showing the carriage mechanism shown in FIG. 4.

In operation, the motor 31 rotates the lead screw 33. The rotation of the lead screw rectilinearly moves the needle 34 engaging the lead screw 33 in the needle 33a, in the axial direction of the lead screw 33. By the rectilinear motion of the needle 34, the carriage 30 moves along the rail 38 in the radial direction of the recording medium. As best illustrated in FIG. 5 (side view), the S0 head 37 is mounted at the distal end portion of the carriage 30. The S1 head 43 is mounted to the distal end portion of the head arm 39, while confronting with the S0 head 37.

As already mentioned, when the discrimination of the FDD 12 used by the disk drive system is used, the carriage 30 is moved from the position of the track 0 as the outermost track toward the outer side, viz., in the forward seek direction. In the FDD 12 of the 48TPI mode, for example, the lead screw stopper 42 is mounted to the distal end portion of the lead screw 33 corresponding to the innermost track (42TR). Accordingly, when the carriage 30 is moved by the lead screw mechanism 32 in the forward seek direction and reaches the innermost track (42TR), the needle 34 collides against the stopper 42 and is stopped there. With the stoppage of the needle 34, the carriage 30 stops the seek operation at the innermost track position. As already described, the FDC 11 produces a STEP signal of "45" pulses, and causes the carriage 30 to forwardly move up to the position corresponding to the track 45. At this time, the needle 34 is at a standstill because of the collision of it against the stopper 42. The lead screw 33 is also at a standstill, regardless of the outputting of the STEP signal. As shown in FIG. 11B, the needle 34 is stopped engaging the groove 33a of the lead screw 33a at the position corresponding to the innermost track (42TR).

Thus, with provision of the stopper 42 of the lead screw mechanism 32, when the carriage 30 reaches the position of the innermost track (42TR), the needle 34 is stopped engaging the groove 33a of the lead screw 33. Accordingly, in the case of the FDD 12 of the 48TIP mode, for example, in the discrimination mode, the needle 34 is prevented from slipping off the groove 33a and running on the lead screw 33. The result, as in the first embodiment, is to secure the stable reciprocal seek operation of the carriage 30, and to reliably discriminate the track density mode of the FDD 12 on the reliable reciprocal seek operation.

Figure 6:
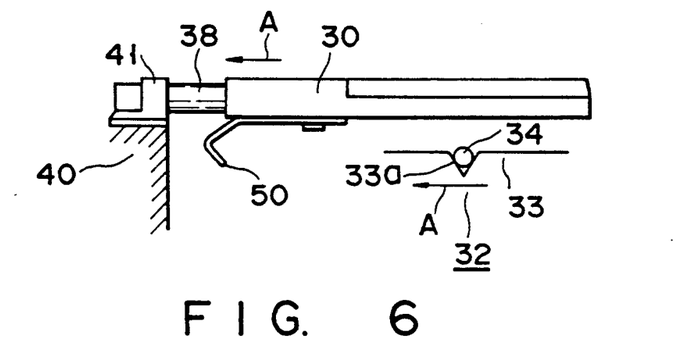
FIGS. 6 through 8 are a set of side views showing a modified carriage mechanism according to the second embodiment of the present invention, and best showing a sequence of the actions of a plate spring stopper used in the carriage mechanism.
Figure 7:
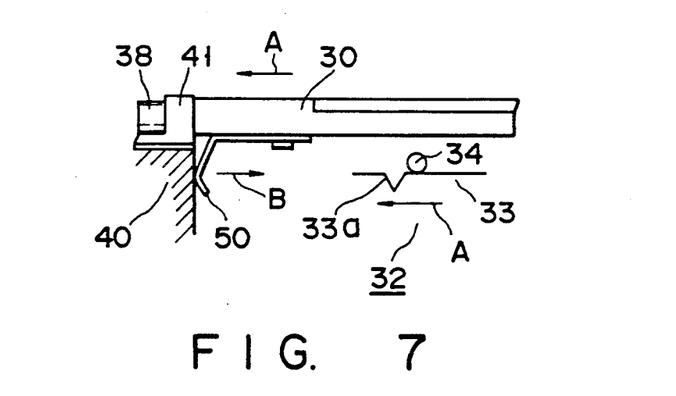
Figure 8:
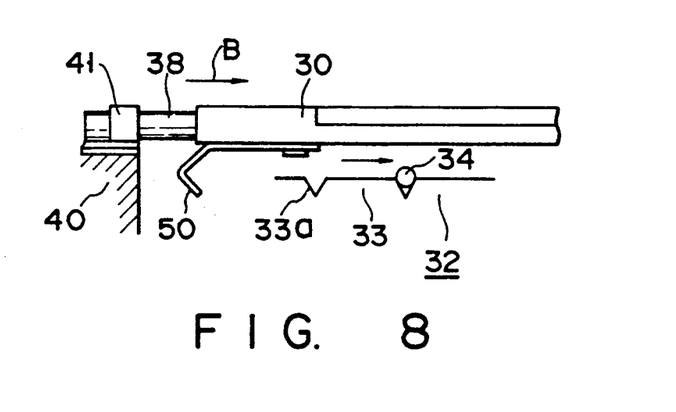
Figures 12A, 12B:
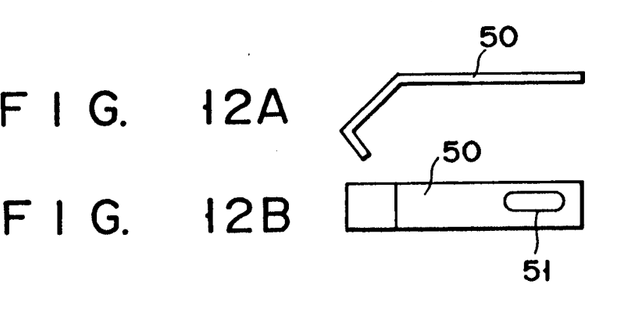
FIGS. 12A and 12B show respectively a side view and a plan view of a plate spring stopper used in the second embodiment.
Figure 13:
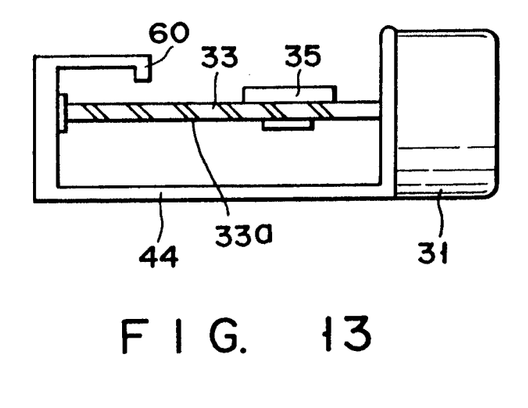
FIGS. 13 through 16 are show a set of side views showing a lead screw mechanism embodiment of the present invention, and showing its operation.
Figure 14:
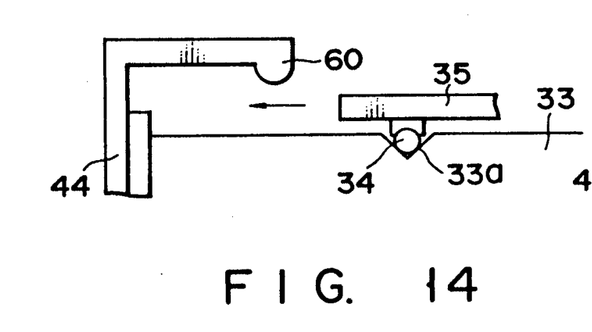

FIGS. 6 to 8 show an alternative arrangement of a carriage mechanism according to the second embodiment of the present invention. In this embodiment, a stopper 50 as a plate spring is mounted to the distal end of the carriage 30. As recalled, the carriage 30 is moved by the lead screw mechanism 32 toward the inner side of the recording medium, i.e., in the forward seek direction (arrow A), and it hits against the stopper 41 of the frame 40 at the position corresponding to the innermost track (42TR). At the time of the hitting, the stopper 50 repulsively pushes the carriage 30 backwardly, viz., toward the outer side of the recording medium (arrow B) An elongated hole 51 is formed in the plate spring of the stopper 50. See FIGS. 12A and 12B. To mount the stopper 50 to the distal end portion of the carriage 30, a suitable means such as a screw is used through the elongated hole 51. In this case, the mounting position of the plate spring plate 50 is adjustable within the length of the hole 51 in the seek direction or in the axial direction of the lead screw 33. The structure except the stopper 50 is substantially the same as that of FIG. 4 or FIG. 5.

When the discrimination mode of the FDD 12 used by the disk drive system commences, the carriage 30 is moved in the forward seek direction, viz., from the track 0 position toward the innermost track. In the case of the FDD 12 of the 48TPI mode, for example, when the carriage 30 is forwarded by the screw mechanism 32 and seeks the innermost track (42TR), it hits against the carriage stopper 41 to a standstill. More exactly, the plate spring stopper 41 contacts the frame 40 just before the carriage 30 hits against the stopper 41. The plate spring 50 pushes the carriage 30 to the outer side of the recording medium (arrow B).

The FDC 11 produces a STEP signal of 45 pulses, and moves the carriage 30 up to the position corresponding to the track 45. At this time, while the carriage 30 is at a standstill, the stepping motor 31 is being driven and hence the lead screw 33 continues its rotation. Under this condition, since the carriage 30 is being held back by the stopper 41 as shown in FIG. 7, the needle 34 possibly slips off the groove 33a of the needle 34. At this time, however, as shown in FIG. 8, the spring plate stopper 50 pushes the carriage 30 from its position where it is stopped by the stopper 41 toward the outer side. As a result, the physical position of the carriage 30 is not coincident with the number of revolutions of the lead screw 33 (number of pulses of the STEP signal from the FDC 11).

When the host computer 10 switches the seek direction from the forward seek direction to the reverse seek direction in the discrimination mode, the carriage 30 moves from the position of the carriage to which the carriage is retarded by the plate spring stopper 50, toward the outermost track 0. In this case, since the physical position of the carriage 30 is not coincident with the number of revolutions of the lead screw 33, when the carriage 30 reaches the track 0 position, the sensing timing of the track-zero sensor 28 is not coincident with a seek detecting position (seek position based on the number of pulses contained in the STEP signal) of the host computer 10. The host computer 10 recognizes that the carriage 30 has mistakenly sought. As the result of this mistaken seeking operation, the forward seek distance (number of tracks) is unequal to the backward seek distance, and the host computer 10 exactly judges that a track density of the FDD 12 is the 48TPI mode.

In case that an object to be discriminated is the FDD 12 of the 96TPI mode, in the forward seek mode, even if the STEP signal containing 45 pulses is produced, the carriage 30 does not hit against the stopper 41. Accordingly, the plate spring 50 does not contact the frame 40, and the carriage 30 is never involved in the mistaken seek operation. For this reason, the number of tracks for the forward seek operation is equal to that for the reverse seek operation (FS=RS). The computer 10 judges that the FDD 12 has the 96TPI mode.

Turning now to FIGS. 13 through 16, there are shown an alternative arrangement of a carriage mechanism according to the second embodiment of the present invention. In this instance, the bracket 44 supporting the lead screw 33 has at the top (as viewed in the drawing) an extension extending toward the outer side of the recording medium and along the lead screw 33. A pivot 60 is formed at or mounted to the distal end of the extension. See FIG. 13. The carriage 30 travels and reaches the innermost track (42TR) of the recording medium, and hits the carriage stopper 41 of the frame 40. At this time, the pivot 60 contacts a needle support member 35 and presses it against the lead screw 33. The remaining structure of the carriage mechanism except the stopper 60 is substantially the same as those of FIGS. 4 and 5.

Figure 15:
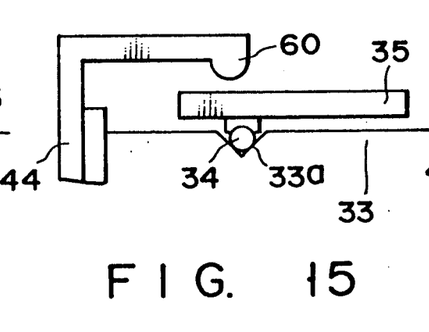
Figure 16:
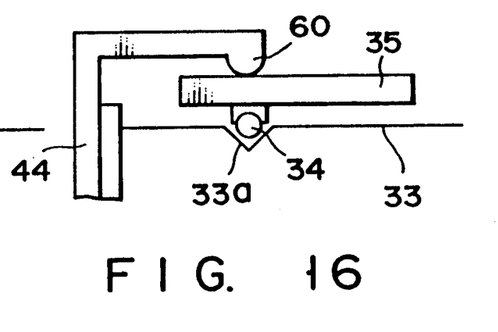

When the discrimination mode of the FDD 12 used by the disk drive system commences, the carriage 30 is moved in the forward seek direction, viz., from the track 0 position toward the innermost track. As shown in FIGS. 15 and 16, the lead screw 33 rotates by the stepping motor 31, so that the needle 34 moves toward the inner side of the recording medium. In the case of the FDD12 of the 48TPI mode, the carriage 30 is forwarded by the screw mechanism 32 and seeks the innermost track (42TR), it hits against the carriage stopper 41 to a standstill. At the position where the carriage 30 stops, viz., the position corresponding to the innermost track (42TR), the needle 34 of the needle support member 35 is right under the pivot 60.

The FDC 11 produces a STEP signal of 45 pulses, and moves the carriage 30 up to the position corresponding to the track 45. At this time, while the carriage 30 is at a standstill, the stepping motor 31 is being driven and hence the lead screw 33 continues its rotation. Under this condition, the needle 34 possibly slips off the groove 33a of the needle 34. At this time, however, the pivot 60 contacts the needle support member 35, and presses it against the lead screw 33. As a result, the needed 34 remains placed in the groove 33a of the lead screw 33, and is stopped there. The pressing of the needle 34 against the lead screw side 33 stops the rotation of the lead screw 33.

When the host computer 10 switches the seek direction from the forward seek direction to the reverse seek direction in the discrimination mode, the carriage 30 moves from the position of the carriage to which the carriage is retarded by the plate spring stopper 50, toward the outermost track 0. As in the other embodiment, during this reverse seek stroke, a mistaken seek operation may be caused to occur, because it is prevented that the needle 34 slips off while the carriage 30 is physically stopped in the forward seek mode.

Since the number of tracks in the forward mode differs from that for the reverse mode (FS is not equal to RS), the host computer 10 is capable of accurately judging that FDD 12 to be discriminated is in the 48TPI mode.

In case that an object to be discriminated is the FDD 12 of the 96TPI mode, in the forward seek mode, even if the STEP signal containing 45 pulses is produced, the carriage 30 does not hit against the stopper 41. Further, the needle 34 is not pressed against the lead screw 33 by the pivot 60, and hence the carriage 30 is not stopped. Therefore, the carriage 30 is never involved in the mistaken seek operation. For this reason, the number of tracks for the forward seek operation is equal to that for the reverse seek operation (FS=RS). The computer judges that the FDD 12 has the 96TPI mode.

What is claimed is:

1. A carriage controlling apparatus for a floppy disk apparatus, comprising:

carriage means having a magnetic head mounted thereon and driven by a stepping motor so as to allow the magnetic head to seek a desired position in a radial direction of a recording medium;

carriage driving means including a lead screw which is rotated by the stepping motor and a motion transmitting member which is engaged with a groove formed on a surface of the lead screw so as to convert the rotation of the lead screw into a linear motion which is transmitted to the carriage means so as to move the carriage means in the radial direction of the recording medium; and drive control means, including lead screw stopper means mounted to the lead screw and serving to stop the rotation of the lead screw at a predetermined track position on an innermost side of the recording medium when the carriage means is moved toward an inner region of the recording medium, the drive control means serving to stop the carriage drive means when the magnetic head has performed its seeking to a predetermined track position on the innermost side of the recording medium.

2. An apparatus according to claim 1, wherein said drive control means comprises the lead screw stopper means mounted to an edge portion of the lead screw and brought into contact with the motion transmitting member at the predetermined track position on the innermost side of the recording medium when the carriage means is moved toward an inner region of the recording medium so as to permit the motion transmitting member to be engaged with the groove of the lead screw and, thus, to stop the rotation of the lead screw.

3. An apparatus according to claim 1, wherein said drive control means comprises carriage stopper means mounted to a frame of the floppy disk apparatus and brought into contact with the carriage means at a predetermined track position on the innermost side of the recording medium when the carriage means is moved toward an inner region of the recording medium so as to stop the movement of the carriage.

4. An apparatus according to claim 3, which further comprises a stopper leaf spring mounted at a tip portion of the carriage means, said leaf spring being brought into contact with a part of the carriage stopper means when the carriage means, moving toward the inner region of the recording medium, collides against the carriage stopper means at a track position o the innermost side of the recording medium so as to urge the carriage means toward an outer region of the recording medium.

5. An apparatus according to claim 3, which further comprises pivot means mounted in the vicinity of the lead screw, said pivot means pushing the motion transmitting means toward the lead screw when the carriage means moving toward the inner region of the recording medium collides against the carriage stopper means at a track position on the innermost side of the recording medium so as to keep the motion transmitting means engaged with the groove of the lead screw.

6. An apparatus according to claim 1, wherein said drive control means comprises the lead screw and brought into contact with the motion transmitting member at a track position on the innermost region of the recording medium determined in accordance with a track density thereof when the carriage means has moved toward the innermost region of the recording medium so as to keep the motion transmitting member engaged with the groove of the lead screw.

7. A carriage controlling apparatus for a floppy disk apparatus, comprising:
 carriage means having a magnetic head mounted thereon and driven by a stepping motor so as to allow the magnetic head to seek a desired position in a radial direction of a recording medium;
 carriage driving means including a lead screw which is rotated by the stepping motor and a motion transmitting member which is engaged with a groove formed on a surface of the lead screw so as to convert the rotation of the lead screw into a linear motion which is transmitted to the carriage means so as to move the carriage means in the radial direction of the recording medium; and
 drive control means including track counter means serving to count the number of tracks corresponding to a seeking distance of the magnetic head when the magnetic head performs a seeking operation thereof from a reference track position on an outermost side of the recording medium toward an inner region thereof, and means for stopping the stepping motor when a number of tracks counted by said track counter means coincides with a maximum number of tracks set in advance so as to stop the rotation of the lead screw, the drive control means serving to stop the carriage driving means when the magnetic head has performed its seeking to a predetermined track position on an innermost side of the recording medium.

8. An apparatus according to claim 7, wherein said drive control means comprises lead screw stopper means mounted to an edge portion of the lead screw and brought into contact with the motion transmitting member at a predetermined track position on the innermost side of the recording medium when the carriage means is moved toward an inner region of the recording medium so as to permit the motion transmitting member to be engaged with the groove of the lead screw and, thus, to stop the rotation of the lead screw.

9. An apparatus according to claim 7, wherein said drive control means comprises carriage stopper means mounted to a frame of the floppy disk apparatus and brought into contact with the carriage means at a predetermined track position on the innermost side of the recording medium when the carriage means is moved toward an inner region of the recording medium so as to stop the movement of the carriage.

10. An apparatus according to claim 9, which further comprises a stopper leaf spring mounted at a tip portion of the carriage means, said leaf spring being brought into contact with a part of the carriage stopper means when the carriage means, moving toward the inner region of the recording medium, collides against the carriage stopper means at a track position on the innermost side of the recording medium so as to urge the carriage means toward an outer region of the recording medium.

11. An apparatus according to claim 9, which further comprises pivot means mounted in the vicinity of the lead screw, said pivot means pushing the motion transmitting means toward the lead screw when the carriage means moving toward the inner region of the recording medium collides against the carriage stopper means at a track position on the innermost side of the recording medium so as to keep the motion transmitting means engaged with the groove of the lead screw.

12. An apparatus according to claim 7, which further comprises discriminating means for discriminating a track density of the recording medium used in the floppy disk apparatus based on the number of tracks corresponding to the seeking distance of the magnetic head which is caused to make a reciprocating seeking movement between the innermost region and outermost region of the recording medium by the movement of the carriage means.

13. An apparatus according to claim 12, wherein said drive control means stops the rotation of the stepping motor when the magnetic head has performed its seeking operation to a predetermined track position on the innermost side of the recording medium, said track position being determined in accordance with the track density discriminated by said discriminating means during the discriminating operation mode, so as to stop the rotation of the lead screw.

14. An apparatus according to claim 12, wherein said drive control means comprises lead screw stopper means mounted at an edge portion of the lead screw and brought into contact with the motion transmitting member at a track position on the innermost region of the recording medium determined in accordance with said track density when the carriage means has moved toward the innermost region of the recording medium so as to keep the motion transmitting member engaged with the groove of the lead screw.

* * * * *